US011031587B2

(12) United States Patent
Ishii et al.

(10) Patent No.: US 11,031,587 B2
(45) Date of Patent: Jun. 8, 2021

(54) NEGATIVE ELECTRODE MATERIAL FOR LITHIUM-ION BATTERIES INCLUDING NON-FLAKY ARTIFICIAL GRAPHITE INCLUDING SILICON-CONTAINING PARTICLES, ARTIFICIAL GRAPHITE PARTICLES AND CARBONACEOUS MATERIAL

(71) Applicants: SHOWA DENKO K. K., Tokyo (JP); UMICORE, Brussels (BE)

(72) Inventors: Nobuaki Ishii, Tokyo (JP); Arihiro Muto, Tokyo (JP); Yasunari Otsuka, Tokyo (JP); Masataka Takeuchi, Tokyo (JP); Dirk Van Genechten, Olen (BE); Stijn Put, Olen (BE)

(73) Assignees: SHOWA DENKO K. K., Tokyo (JP); UMICORE, Brussels (BE)

( * ) Notice: Subject to any disclaimer, the term of this patent is extended or adjusted under 35 U.S.C. 154(b) by 215 days.

(21) Appl. No.: 15/740,868

(22) PCT Filed: Jul. 1, 2016

(86) PCT No.: PCT/JP2016/069633
§ 371 (c)(1),
(2) Date: Dec. 29, 2017

(87) PCT Pub. No.: WO2017/002959
PCT Pub. Date: Jan. 5, 2017

(65) Prior Publication Data
US 2018/0190975 A1 Jul. 5, 2018

(30) Foreign Application Priority Data
Jul. 2, 2015 (JP) .............................. JP2015-133590

(51) Int. Cl.
| | |
|---|---|
| *H01M 4/36* | (2006.01) |
| *H01M 4/587* | (2010.01) |
| *H01M 4/133* | (2010.01) |
| *C01B 33/02* | (2006.01) |
| *H01M 4/134* | (2010.01) |
| *H01M 4/485* | (2010.01) |
| *H01M 4/38* | (2006.01) |
| *H01M 4/48* | (2010.01) |
| *H01M 10/0525* | (2010.01) |
| *H01M 4/02* | (2006.01) |
| *C01B 32/205* | (2017.01) |
| *C01B 33/18* | (2006.01) |

(52) U.S. Cl.
CPC ........... *H01M 4/364* (2013.01); *C01B 32/205* (2017.08); *C01B 33/02* (2013.01); *C01B 33/18* (2013.01); *H01M 4/133* (2013.01); *H01M 4/134* (2013.01); *H01M 4/366* (2013.01); *H01M 4/386* (2013.01); *H01M 4/483* (2013.01); *H01M 4/485* (2013.01); *H01M 4/587* (2013.01); *H01M 10/0525* (2013.01); *C01P 2002/74* (2013.01); *C01P 2002/78* (2013.01); *C01P 2004/51* (2013.01); *C01P 2004/62* (2013.01); *C01P 2006/12* (2013.01); *C01P 2006/14* (2013.01); *C01P 2006/16* (2013.01); *C01P 2006/40* (2013.01); *H01M 2004/021* (2013.01); *H01M 2004/028* (2013.01)

(58) Field of Classification Search
CPC .. H01M 4/364; H01M 10/0525; H01M 4/483; H01M 4/386; H01M 4/366; H01M 4/587; H01M 2004/028; H01M 2004/021; H01M 4/485; H01M 4/134; H01M 4/133; H01M 4/131; C01B 33/18; C01B 32/205; C01B 33/02; C01P 2006/40; C01P 2006/16; C01P 2006/14; C01P 2006/12; C01P 2004/62; C01P 2004/51; C01P 2002/78; C01P 2002/74; Y02E 60/10
See application file for complete search history.

(56) References Cited

U.S. PATENT DOCUMENTS

| | | | |
|---|---|---|---|
| 8,920,977 B2 | 12/2014 | Kameda et al. | |
| 9,847,524 B2 | 12/2017 | Yamamoto et al. | |
| 10,109,848 B2* | 10/2018 | Murata | ............ H01M 10/0525 |
| 2002/0009646 A1 | 1/2002 | Matsubara et al. | |
| 2005/0074672 A1 | 4/2005 | Matsubara et al. | |

(Continued)

FOREIGN PATENT DOCUMENTS

| | | |
|---|---|---|
| CN | 102362381 A | 2/2012 |
| CN | 104247130 A | 12/2014 |

(Continued)

OTHER PUBLICATIONS

Machine translation of JP 2012-043546, Kozu et al., 2012 (Year: 2012).*

(Continued)

*Primary Examiner* — Kwang Han
(74) *Attorney, Agent, or Firm* — Sughrue Mion, PLLC

(57) ABSTRACT

A negative electrode material for a lithium ion battery, including silicon-containing particles, artificial graphite particles and a carbonaceous material, wherein at least part of the silicon-containing particles, the artificial graphite particles and the carbonaceous material form composite particles; wherein the silicon-containing particles are silicon particles having a SiOx (0<x≤2) layer on the particle surface, having an oxygen content of 1.0 mass % or more and 18.0 mass % or less, and mainly containing particles having a primary particle diameter of 200 nm or less; wherein the artificial graphite particles are non-flaky artificial graphite particles and have a 50% particle diameter in a volume-based cumulative particle size distribution, D50, of 1.0 μm or more and 15.0 μm or less. Also disclosed is a lithium-ion battery including a negative electrode using the negative electrode material.

11 Claims, No Drawings

(56) References Cited

U.S. PATENT DOCUMENTS

| | | | |
|---|---|---|---|
| 2006/0068287 A1 | 3/2006 | Morita et al. | |
| 2006/0166098 A1 | 7/2006 | Tabuchi et al. | |
| 2010/0203392 A1 | 8/2010 | Yamada et al. | |
| 2012/0052393 A1 | 3/2012 | Kameda et al. | |
| 2012/0115033 A1 | 5/2012 | Kim et al. | |
| 2012/0196193 A1* | 8/2012 | Sotowa | H01M 4/133 429/338 |
| 2012/0208083 A1* | 8/2012 | Ati | H01M 4/0419 429/211 |
| 2015/0079463 A1 | 3/2015 | Yamamoto et al. | |
| 2016/0185600 A1 | 6/2016 | Sotowa et al. | |
| 2016/0190552 A1 | 6/2016 | Murata et al. | |

FOREIGN PATENT DOCUMENTS

| | | | | |
|---|---|---|---|---|
| CN | 102362381 B | | 6/2015 | |
| JP | 2005-108774 A | | 4/2005 | |
| JP | 2012-009457 A | | 1/2012 | |
| JP | 2012-043546 | * | 3/2012 | H01M 4/36 |
| JP | 2012-099452 A | | 5/2012 | |
| KR | 2001-0113448 A | | 12/2001 | |
| WO | 2009/063902 A1 | | 5/2009 | |
| WO | 2015/016182 A1 | | 2/2015 | |
| WO | 2015/019994 A1 | | 2/2015 | |
| WO | WO 2015/019994 | * | 2/2015 | H01M 4/587 |

OTHER PUBLICATIONS

International Search Report for PCT/JP2016/069633 dated Oct. 4, 2016 [PCT/ISA/210].
Su et al., "Core double-shell Si@SiO$_2$@C nancomposites as anode materials for Li-ion Batteries", Chem. Commun., 2010, 46, pp. 2590-2592.
Communication dated Feb. 15, 2019 by the European Patent Office in counterpart EP application No. 16818067.7.
Communication dated Oct. 16, 2019, issued by the Korean Intellectual Property Office in corresponding Korean Application No. 10-2018-7000527.
Communication dated Mar. 19, 2020 from the State Intellectual Property Office of the P.R.C. in Application No. 201680037961.7.
Office Action dated Jan. 26, 2021 in European Application No. 16818067.7.
Malvern, Sysmex FPIA-2100, product brochure, 2001, http://www.cforce.co.uk/PDF/MalvernFPIA2100.pdf (5 pages total).
Malvern, Sysmex FPIA-3000, product brochure, 2005, https://www.sysmex.nl/fileadmin/media/fl02/MLS/Brochure/Malvern_FPIA3000_Brochure.pdf (12 pages total).

* cited by examiner

NEGATIVE ELECTRODE MATERIAL FOR LITHIUM-ION BATTERIES INCLUDING NON-FLAKY ARTIFICIAL GRAPHITE INCLUDING SILICON-CONTAINING PARTICLES, ARTIFICIAL GRAPHITE PARTICLES AND CARBONACEOUS MATERIAL

CROSS REFERENCE TO RELATED APPLICATIONS

This application is a National Stage of International Application No. PCT/JP2016/069633, filed on Jul. 1, 2016, which claims priority from Japanese Patent Application No. 2015-133590, filed on Jul. 2, 2015, the contents of all of which are incorporated herein by reference in their entirety.

TECHNICAL FIELD

The present invention relates to a negative electrode material for lithium ion batteries and use thereof. Specifically, the present invention relates to a negative electrode which is capable of obtaining lithium ion batteries having a large charge-discharge capacity and excellent charge/discharge cycle characteristics; a paste comprising the negative electrode; a negative electrode sheet obtained by the application of the paste; and a lithium ion battery comprising the negative electrode sheet.

BACKGROUND ART

Multi-functionalization of a portable electronic device has proceeded faster than power saving of an electronic component. Therefore, the portable electronic device has been increased in power consumption. In consequence, a lithium ion battery serving as a main power supply of the portable electronic device has been required to have a high capacity and a small size more strongly than ever before. In addition, along with growing demand for an electric vehicle, also a lithium ion battery to be used in the electric vehicle has been strongly required to have a high capacity.

Graphite has hitherto been mainly used as a negative electrode material for the lithium ion battery. Graphite exhibits excellent cycle characteristics, but can stoichiometrically occlude lithium only up to a ratio of LiC6. Therefore, a theoretical capacity of a lithium ion battery using graphite for a negative electrode is 372 mAh/g.

In order to realize a high capacity of the lithium ion battery, an investigation has been made on using particles containing a metal element having a high theoretical capacity, such as Si or Sn, for the negative electrode material. Since Si and Sn has a higher theoretical capacity than graphite, a lithium ion battery having a higher capacity can be provided when Si and Sn can be used for the negative electrode material. However, the negative electrode material, such as Si, shows a high expansion rate and a high contraction rate in association with intercalation and deintercalation (occlusion and release) of lithium ions. Therefore, a capacity as high as that expected is not obtained owing to a gap generated between the active material particles. In addition, the particles are broken to be finer through repetition of great expansion and contraction. Therefore, electrical contact is disrupted and hence internal resistance increases. In consequence, the lithium ion battery to be obtained has a short charge-discharge cycle lifetime.

In view of the foregoing, a combination of a carbonaceous material and Si has been proposed. For example, Patent Document 1 has proposed a negative electrode material obtained by immobilizing Si ultrafine particles, which had been formed by a gas evaporation method, onto the surfaces of graphite particles by means of mechanochemical treatment, and mixing petroleum mesophase pitch therewith, followed by carbonization.

PRIOR ART

Patent Document

[Patent Document 1] JP 2005-108774 A (US 2005/074672 A1)

DISCLOSURE OF THE INVENTION

Problem to be Solved by the Invention

Generally, ultrafine particles aggregate with each other due to a very high surface activity, and it is difficult to disperse the aggregates into a single particle. That is, even when mechanochemical treatment is employed, ultrafine particles are attached onto the graphite surface not in a state where the particles are dispersed into a single particle but as being aggregated particles.

The same holds true for Patent Document 1. Even if mechanochemical treatment is carried out, the surface activity of the Si ultrafine particles per se is not controlled, and hence Si ultrafine particles are attached onto the graphite surface not in a state where the particles are dispersed into a single particle but as being aggregated particles. Therefore, expansion and contraction in association with intercalation and deintercalation (occlusion and release) of lithium ions occur in Si in a state of aggregated particles, which breaks a composite structure. As a result, the cycle life has not been sufficiently improved.

Thus, the charge-discharge cycle characteristics when Si as being a metal element capable of forming alloy with lithium is used as a negative electrode material has not been fully improved, and further improvement has been desired.

Means to Solve the Problem

The present invention relates to the followings.
[1] A negative electrode material for a lithium ion battery, comprising silicon-containing particles, artificial graphite particles and a carbonaceous material, wherein at least part of the silicon-containing particles, the artificial graphite particles and the carbonaceous material form composite particles;
wherein the silicon-containing particles are silicon particles having a SiOx ($0<x\leq2$) layer on the particle surface, having an oxygen content of 1.0 mass % or more and 18.0 mass % or less, and mainly comprising particles having a primary particle diameter of 200 nm or less;
wherein the artificial graphite particles are non-flaky artificial graphite particles and have a 50% particle diameter in a volume-based cumulative particle size distribution, D50, of 1.0 μm or more and 15.0 μm or less.
[2] The negative electrode material for a lithium ion battery according to [1] above, wherein the artificial graphite particles are non-flaky artificial graphite particles and have a ratio between a peak intensity $I_{110}$ of (110) plane and a peak intensity $I_{004}$ of (004) plane of a graphite crystal determined by a powder XRD measurement, $I_{110}/I_{004}$, is 0.10 or more and 0.35 or less; an average interplanar spacing d002 of (002) plane by an X-ray diffraction method is 0.3360 nm or less; an average circularity is 0.80 or more and 0.95 or less; and a total pore volume of pores having a diameter of 0.4 μm or less measured by a nitrogen gas adsorption method is 5.0 μl/g or more and 40.0 μl/g or less;

and by observing optical structures in a cross-section of the artificial graphite particle, when areas of the optical structures are accumulated from a smallest structure in an ascending order, SOP represents an area of an optical structure whose accumulated area corresponds to 60% of a total area of all the optical structures; when the structures are counted from a structure of a smallest aspect ratio in an ascending order, AROP represents an aspect ratio of a structure which ranks at a position of 60% in a total number of all the structures; and when D50 represents a median diameter in a volume-based cumulative particle size distribution by laser diffraction method, SOP, AROP and D50 satisfy the following relationships:

$$1.5 \leq AROP \leq 6.0 \text{ and}$$

$$0.2 \times D50 \leq (SOP \times AROP)^{1/2} < 2 \times D50.$$

[3] The negative electrode material for a lithium ion battery according to [1] or [2] above, wherein the artificial graphite particles have a 50% diameter in a volume-based cumulative particle size distribution by laser diffraction method, D50, of 10.0 μm or less.

[4] The negative electrode material for a lithium ion battery according to any one of [1] to [3] above, wherein the content of the silicon-containing particles is 5.0 parts by mass or more and 30.0 parts by mass or less with respect to 100 parts by mass of the artificial graphite particles.

[5] The negative electrode material for a lithium ion battery according to any one of [1] to [4] above, wherein the carbonaceous material is obtained by subjecting petroleum pitch or coal pitch to heat treatment.

[6] The negative electrode material for a lithium ion battery according to any one of [1] to [5] above, wherein the amount of the carbonaceous material is 2.0 mass % or more and 40.0 mass % or less to the total of the silicon-containing particles, the artificial graphite particles and the carbonaceous material.

[7] The negative electrode material for a lithium ion battery according to any one of [1] to [6] above, wherein a 50% diameter in a volume-based cumulative particle size distribution by laser diffraction method, D50, is 2.0 μm or more and 18.0 μm or less.

[8] The negative electrode material for a lithium ion battery according to any one of [1] to [7] above, wherein the BET specific surface area of which is 2.0 m$^2$/g or more and 10.0 m$^2$/g or less.

[9] The negative electrode material for a lithium ion battery according to any one of [1] to [8] above, wherein the average interplanar spacing d002 of plane (002) by the X-ray diffraction method is 0.3360 nm or less.

[10] The negative electrode material for a lithium ion battery according to any one of [1] to [9] above, wherein the ratio $I_D/I_G$ (R value) between the peak intensity ($I_D$) of a peak in a range of 1300 to 1400 cm$^{-1}$ and the peak intensity ($I_G$) of a peak in a range of 1580 to 1620 cm$^{-1}$ measured by Raman spectroscopy spectra when the composite particle is measured with Raman microspectrometer is 0.15 or more and 1.00 or less.

[11] A paste comprising the negative electrode material for a lithium ion battery according to any one of [1] to [10] above and a binder.

[12] An electrode for a lithium ion battery comprising a formed body of the paste for an electrode according to [11] above.

[13] A lithium ion battery comprising the electrode according to [12] above as a constituting element.

Effects of the Invention

The negative electrode material of the present invention has a large discharge capacity per mass and excellent initial efficiency. Through use of the negative electrode material, the lithium ion battery having a high capacity and excellent charge-discharge cycle characteristics can be produced.

MODE FOR CARRYING OUT THE INVENTION

Silicon-Containing Particles

The silicon-containing particles are the silicon particles which have a SiOx layer (0<x≤2) on a particle surface. The part except for the surface (core) may be made of elemental silicon or SiOx layer (0<x<2). The average thickness of the surface layer containing SiOx is preferably 0.5 nm or more and 10.0 nm or less. When the average thickness of the surface layer containing SiOx is 0.5 nm or more, it can inhibit oxidation by air and an oxidizing gas. When the average thickness of the surface layer containing SiOx is 10.0 nm or less, an increase in irreversible capacity in initial stage cycles can be suppressed. The average thickness is measured through a TEM photograph.

The oxygen content ratio of the silicon-containing particles in the entirety of the particles is preferably 1.0 mass % or more and 18.0 mass % or less, more preferably 2.0 mass % or more and 10.0 mass % or less. When the oxygen content ratio falls within the above-mentioned range, an increase in irreversible capacity in initial stage cycles can be suppressed. The oxygen content ratio may be quantified by, for example, a simultaneous determination of oxygen and nitrogen analyzer (an inert gas fusion-infrared absorption method).

It is desirable that the silicon-containing particles mainly comprise particles having a primary particle diameter of 200 nm or less. Specifically, a 90% diameter in a number-based cumulative particle size distribution of the primary particles, D90, is preferably 200 nm or less. The primary particle diameter may be measured through micrograph observation with a SEM, a TEM, or the like. With respect to the primary particles of the silicon particles obtained by forming a complex, they can be e by the image analysis of the spherical particles observed by a 100,000-power transmission electron microscope.

The silicon-containing particles have a diameter calculated by the following equation, Dav, of preferably 20 nm or more and 150 nm or less, more preferably 30 nm or more and 120 nm or less.

$$Dav=6/(\rho \times Ssa)$$

Dav: an average diameter on the assumption that the particles are dense spheres

Ssa: BET specific surface area (m$^2$/g) of silicon-containing particles

ρ: true density of silicon particles (2.33 g/cm$^3$ as a theoretical value)

When the diameter, Dav, falls within the above-mentioned range, volume strain in association with intercalation of Li into a Si crystal phase can be reduced, and hence expansion and contraction in association with charge and discharge, which are the greatest drawback in the case of using Si for a negative electrode active material, can be suppressed.

The silicon-containing particles may further contain element M selected from other metal elements and metalloid elements (including carbon element) therein. Specific examples of element M include, for example, nickel, copper, iron, tin, aluminum and cobalt. There is no particular limit on the content of element M as long as it is within a scope which does not inhibit the silicon action significantly. The content is, for example, 1 mole or less per mole of silicon atoms.

The silicon-containing particles is not particularly limited by the production method thereof. For example, they may be produced by a method disclosed in WO 2012/000858 A1.

The content of the silicon-containing particles is preferably 5.0 parts by mass or more and 30.0 parts by mass or less, more preferably 7.0 parts by mass or more and 25.0 parts by mass or less, with respect to 100 parts by mass of the artificial graphite particles. When the amount of the silicon-containing particles is small, there is trend toward decrease in the effect of improving the battery capacity, which effect is obtained by the addition of the particles. When the amount of the silicon-containing particles is large, it will facilitate volume strain in association with intercalation and deintercalation (occlusion and release) of lithium ions.

Artificial Graphite Particles

Since graphite particles are hard when the graphite has an entangled structure, it is desirable to allow the graphite particles to have a large structure in order to increase the electrode density. It has been long known that, as a structure which is observed in graphite particles, there are a structure which exhibits optical anisotropy by crystal developing and graphite planes arranged, and a structure which exhibits optical isotropy by crystal not developing completely or largely disordered such as hard carbon. With respect to the observation of these structures, a crystallite size can be measured by the X-ray diffraction method and the structures can be observed by a polarizing microscope observation method described in, for example, "Modern Carbon Material Experimental Technology (Analysis part) edited by The Carbon Society of Japan (2001), published by Sipec Corporation, pages 1-8". In the present description, an individual domain in which a color other than black (a color other than the sensitive color when a sensitive color plate is used) can be observed when a sample was observed under a crossed-nicol state of a polarizing microscope is referred to as an optical structure.

In the artificial graphite particles in a preferable embodiment of the present invention, the size and shape of the optical structures are within a specific range. Furthermore, due to an appropriate degree of graphitization, it becomes a material being excellent both in easiness to be collapsed as a material for an electrode and in battery properties.

With respect to the size and shape of the optical structure, the artificial graphite particles in a preferable embodiment of the present invention satisfy the following formula:

$1.5 \leq AROP \leq 6.0$ and $0.2 \times D50 \leq (SOP \times AROP)^{1/2} < 2 \times D50$ By observing optical structures in the cross-section of the formed body made of the carbon material under a polarizing microscope, when areas of the optical structures are accumulated from the smallest structure in an ascending order, SOP represents the area of the optical structure whose accumulated area corresponds to 60% of the total area of all the optical structures. In the same observation, when the structures are counted from a structure of the smallest aspect ratio in an ascending order, AROP represents the aspect ratio of the structure which ranks at the position of 60% in the total number of all the structures.

D50 represents a 50% particle diameter in a volume-based cumulative particle size distribution measured by a laser diffraction method.

Since the optical structures in the carbon material are cured while flowing, it is often strip-shaped. When the cross-section of the carbon material is observed, the shape of the optical structures is almost rectangular, and it can be assumed that the area of the structure corresponds to the product of the long diameter and the short diameter of the structure. Also, the short diameter is the long diameter/aspect ratio. Assuming that the optical structure as an object to be measured for the area represented by SOP and the optical structure as an object to be measured for the aspect ratio represented by AROP are the same, the long diameter in the optical structure turns to be $(SOP \times AROP)^{1/2}$. That is, $(SOP \times AROP)^{1/2}$ defines the long diameter in an optical structure having a specific size, and based on the ratio of $(SOP \times AROP)^{1/2}$ to D50, the above-mentioned formula defines that the optical structure is larger than a certain size.

$(SOP \times AROP)^{1/2}$ which defines a long diameter of an optical structure is generally smaller than D50. However, when the $(SOP \times AROP)^{1/2}$ value is closer to D50, it means that the particles in the carbon material consist of a smaller number of optical structures. In a case where $(SOP \times AROP)^{1/2}$ is smaller compared to D50, it means that the particles in the carbon material comprise a large number of optical structures. When the $(SOP \times AROP)^{1/2}$ value is 0.2× D50 or more, there are fewer borders of the optical structures, which is preferable for the lithium ion diffusion and enables a high-rate charge and discharge. When the value is larger, the carbon material can retain a larger number of lithium ions. The value is preferably 0.25×D50 or more, more preferably 0.28×D50 or more, and still more preferably 0.35×D50 or more. The upper limit value is less than 2×D50 at maximum, preferably 1×D50 or less.

D50 represents a 50% particle diameter in a volume-based cumulative particle size distribution measured by a laser-diffractometry particle size distribution analyzer, and indicates an apparent diameter of the particles. As a laser diffraction type particle size distribution analyzer, for example, Mastersizer (registered trademark) produced by Malvern Instruments Ltd. or the like can be used.

D50 of the artificial graphite particles in a preferable embodiment of the present invention is 1 μm or more and 15 μm or less. D50 is preferably 1 μm or more and 10 μm or less, more preferably 1 μm or more and 7 μm or less. Pulverizing by special equipment is required to make D50 less than 1 μm and more energy is required as a result. In addition, it is difficult to handle particles having D50 less than 1 μm due to aggregation and reduction in the coating processability, and excessive increase in the specific surface area reduces the initial charge-discharge efficiency. On the other hand, if the D50 value is too large, it takes a longer time for the lithium diffusion in the negative electrode material and the input-output characteristics is reduced; and it makes it difficult for the silicon-containing particles are uniformly integrated with the surface of the artificial graphite particles, and the cycle characteristics is reduced. That is, by setting D50 within the above-mentioned range, it becomes possible to obtain a negative electrode material having good initial charge-discharge efficiency, input-output characteristics and cycle characteristics, with high economic efficiency.

The aspect ratio of the artificial graphite particles in a preferable embodiment of the present invention, AROP, is preferably 1.5 or more and 6.0 or less, more preferably 2.0 or more and 4.0 or less, still more preferably 2.0 or more and 2.3 or less. An aspect ratio larger than the above lower limit is preferable because it allows the structures to slide over each other and an electrode having a high density can be easily obtained. An aspect ratio smaller than the upper limit is preferable because it requires less energy to synthesize a raw material.

The methods for observation and analysis of the optical structures are as described below.

[Production of Polarizing Microscope Observation Sample]

The "cross-section of a carbon material" as used herein is prepared as follows.

A double-stick tape is attached to the bottom of a sample container made of plastic with an internal volume of 30 cm$^3$, and two spatula scoops (about 2 g) of a sample for observation is placed on the double-stick tape. A curing agent (Curing Agent (M-agent) (trade name), produced by Nippon Oil and Fats Co., Ltd., available from Marumoto Struers K.K.) is added to cold embedding resin (Cold embedding resin #105 (trade name), produced by Japan Composite Co., Ltd., available from Marumoto Struers K.K.), and the mixture is kneaded for 30 seconds. The resultant mixture (about 5 ml) is poured slowly to the sample container to a height of about 1 cm and allowed to stand still for 1 day to be coagulated. Next, the coagulated sample is taken out and the double-stick tape is peeled off. Then, a surface to be measured is polished with a polishing machine with a rotary polishing plate.

The polishing is performed so that the polishing surface of the sample is pressed against the rotary surface. The polishing plate is rotated at 1,000 rpm. The polishing is performed successively, using polishing plates having particle sizes (grit numbers) of #500, #1000, and #2000 in this order, and finally, mirror-surface polishing is performed, using alumina (BAIKALOX (registered trademark) type 0.3CR (trade name) with a particle diameter of 0.3 μm, produced by BAIKOWSKI, available from Baikowski Japan).

The polished sample is fixed onto a preparation with clay and observed with a polarizing microscope (BX51, produced by Olympus Corporation).

Polarizing Microscope Image Analysis Method

The observation was performed at 200-fold magnification. An image observed with the polarizing microscope is photographed by a CAMEDIA (registered trademark) C-5050 ZOOM digital camera produced by Olympus Corporation connected to the polarizing microscope through an attachment. The shutter time is 1.6 seconds. Among the photographed data, images with 1,200×1,600 pixels were used as an analysis object. It corresponds to a microscope field of 480 μm×640 μm. It is desirable to use larger number of images for the analysis and measurement error can be reduced by using 40 images or more. The image analysis was performed using ImageJ (produced by National Institutes of Health) to discriminate blue portions, yellow portions, magenta portions and black portions.

The parameters defining each color when ImageJ was used are given below.

| | Hue value | Saturation value | Brightness value |
|---|---|---|---|
| Blue | 150 to 190 | 0 to 255 | 80 to 255 |
| Yellow | 235 to 255 | 0 to 255 | 80 to 255 |
| Magenta | 193 to 255 | 180 to 255 | 120 to 255 |
| Black | 0 to 255 | 0 to 255 | 0 to 120 |

The statistical processing with respect to the detected structures is performed using an external macro-file. The black portions, that is, portions corresponding not to optical structures but to resin are excluded from the analysis, and the area and aspect ratio of each of blue, yellow and magenta optical structures are to be calculated.

The artificial graphite particles in a preferable embodiment of the present invention comprise carbon particles that are not flaky. This is to prevent the orientation of the carbon network layer at the time of producing an electrode using the negative electrode material. Orientation is used as an index of the degree of flakiness. That is, in the artificial graphite particles in a preferable embodiment of the present invention, $I_{110}/I_{004}$ as being the ratio between the peak intensity $I_{110}$ of plane (110) and the peak intensity $I_{004}$ of plane (004) of a graphite crystal in the XRD pattern determined by the powder XRD measurement is 0.10 or more and 0.35 or less. The ratio is preferably 0.18 or more and 0.30 or less, still more preferably 0.21 or more and 0.30 or less. Artificial graphite particles having an $I_{110}/I_{004}$ value less than 0.1 have too high orientation and make an electrode easier to expand in a direction vertical to the current collector plane in the electrode due to expansion and contraction in association with intercalation and deintercalation (occlusion and release) of lithium ions in Si and graphite in the negative electrode material, which has an adverse impact on the cycle life. In addition, the carbon network layer becomes parallel to the electrode plate, which makes the Li ion insertion difficult to proceed and leads to degradation of the rapid charge-discharge characteristics. When artificial graphite particles have an $I_{110}/I_{004}$ value higher than 0.35, the orientation of the particles is too low, and the electrode density becomes difficult to increase at the time of pressing during the production of an electrode using the negative electrode material.

In addition, when the carbon particles are flaky, it becomes difficult to handle them due to the decrease in the bulk density. They have low affinity for a solvent when they are made into slurry for producing an electrode, which leads to a reduced peeling strength of the electrode in some cases.

The orientation of particles is also related to the above mentioned optical structures.

The artificial graphite particles in a preferable embodiment of the present invention have an average circularity of 0.80 to 0.95. As described above, an average circularity is lowered in the case of flaky particles and the case of particles having irregular shapes. In the case of flaky particles, they make an electrode using the negative electrode material easier to expand, and the cycle life are degraded. In the case of particles having irregular shapes, the electrode density is difficult to increase at the time of producing an electrode due to the increased gap between the particles. On the other hand, if the average circularity is too high, the contact area between the particles becomes smaller at the time of producing an electrode, which leads to high resistance and degradation of input-output characteristics. The average circularity is preferably 0.83 to 0.93, more preferably 0.85 to 0.90.

The average circularity is calculated from the frequency distribution of the circularity obtained from the analysis of 10,000 particles or more in the LPF mode by using FPIA-3000 (manufactured by Sysmex Corporation). Here, circularity is a value obtained by dividing the circumferential length of a circle having the same area with that of the observed particle image by the circumferential length of the particle image, and the particle image is closer to a true circle when its circularity is closer to 1. When S represents the area and L represents the circumferential of the particle image, circularity is represented by the following formula.

$$\text{Circularity} = (4\Pi S)^{1/2}/L$$

The artificial graphite particles in a preferable embodiment of the present invention has an average interplanar spacing (002) plane by the X-ray diffraction method, d002, of 0.3360 nm or less. This increases the amount of lithium ions to be intercalated and desorbed per mass of the artificial graphite particles in the negative electrode material; i.e. increases the weight energy density of the negative electrode material as well. Further, this suppresses electrode expansion and contraction in association with intercalation and deintercalation (occlusion and release) of lithium ions in Si in the negative electrode material, and the cycle life is improved.

A thickness of the crystal in the C-axis direction, Lc, is preferably 50 to 1,000 nm from the viewpoint of the weight energy density and easiness to be collapsed.

d002 and Lc can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "carbon", 1963, No. 36, pages 25-34).

In a preferred embodiment of the present invention, the BET specific surface area of the artificial graphite particles is 1.0 m$^2$/g or more and 9.0 m$^2$/g or less, more preferably 3.0 m$^2$/g or more and 7.5 m$^2$/g or less. When the BET specific surface area of the artificial graphite particles is less than 1.0 m$^2$/g, it is difficult for the silicon-containing particles, and pitch that is a precursor of the carbonaceous material to be integrated with the artificial graphite particles, and improvement of the cycle life is not sufficient. When the BET specific surface area of the artificial graphite particles exceeds 9.0 m$^2$/g, it increases the BET specific surface area of the negative electrode material, resulting in irreversible side reactions on the surface of the active material and excessive use of a binder. By setting the BET specific surface area of the artificial graphite particles to be within the above-mentioned range, irreversible side reactions in the negative electrode material can be suppressed, and a large area to be contacted with an electrolyte can be secured. As a result, the input-output characteristics can be improved.

The BET specific surface area is measured by a common method of measuring the absorption and desorption amount of gas per mass. As a measuring device, for example, NOVA-1200 can be used.

In the artificial graphite particles in a preferable embodiment of the present invention, the total pore volume of the pores having a diameter of 0.4 μm or less measured by the nitrogen gas adsorption method with liquid nitrogen cooling is 5.0 μl/g to 40.0 μl/g, preferably 25.0 μl/g to 40.0 μl/g. Pores are generated and enlarged by undergoing a moderate oxidation, and thus artificial graphite particles having a total pore volume within the above-described range can be produced. When the total pore volume is 5.0 μl/g or more, it makes the silicon-containing particles, and pitch that is a precursor of the carbonaceous material easier to be integrated with the artificial graphite particles, which is preferable from the viewpoint of improvement of the cycle life. When the total pore volume is 40.0 μl/g or less in artificial graphite particles having an Lc value of 100 nm or more measured by the X-ray diffraction method, irreversible change of the structure due to the anisotropic expansion and contraction in the graphite layer at the time of charging and discharging is less likely to occur, which further improves cycle characteristics of the negative electrode material. When the total pore volume of the artificial graphite particles is within the range, the electrolytic solution is allowed to impregnate easily at the time of using the negative electrode material thereof as an active material, which is preferable from the viewpoint of the rapid charge and discharge characteristics.

The artificial graphite particles in a preferable embodiment of the present invention has an R value ($I_D/I_G$) of preferably 0.04 or more and 0.18 or less, more preferably 0.08 or more and 0.16 or less, which value is the ratio between the peak intensity (peak height) $I_D$ of a peak within the range of 1300 to 1400 cm$^{-1}$ derived from an amorphous component and the peak intensity (peak height) $I_G$ of a peak within the range of 1580 to 1620 cm$^{-1}$ derived from a graphite component measured by Raman spectroscopy spectra. When the R value is less than 0.04, the rapid charge-discharge property shows tendency to deterioration due to high graphite crystallinity. When the R value exceeds 0.18, it promotes side reactions at the time of charge and discharge by the existence of many defects, resulting in the deterioration of the cycle characteristics.

The Raman spectrum can be measured, for example, using NRS-5100 produced by JASCO Corporation, by observing under the attached microscope.

Method for Producing Artificial Graphite Particles

Artificial graphite particles in a preferred embodiment of the present invention can be produced by heating the particles of pulverized coke having a thermal history of 1,000° C. or less.

As a raw material of calcined coke, for example, petroleum pitch, coal pitch, coal pitch coke, petroleum coke and the mixture thereof can be used. Among these, preferred is the coke obtained by a delayed coking process under specific conditions.

Examples of raw materials to pass through a delayed coker include decant oil which is obtained by removing a solvent after the process of fluid catalytic cracking to heavy distillate at the time of crude refining, and tar obtained by distilling coal tar extracted from bituminous coal and the like at a temperature of 200° C. or more and heating it to 100° C. or more to impart sufficient flowability. These liquids are heated to preferably 450° C. or more, more preferably 500° C. or more, or still more preferably 510° C. or more, during the delayed coking process, at least at an inlet of the coking drum in order to increase the residual carbon ratio in the subsequent processes, resulting in improvement in the yield. Also, pressure inside the drum is kept at preferably an ordinary pressure or higher, more preferably 300 kPa or higher, still more preferably 400 kPa or higher to increase the capacity of a negative electrode. As described above, by performing coking under more severe conditions than usual, the reaction of the liquids is further enhanced and coke having a higher degree of polymerization can be obtained.

The obtained coke is to be cut out from the drum by water jetting, and roughly pulverized to lumps about the size of 5 centimeters with a hammer and the like. A double roll crusher and a jaw crusher can be used for the rough pulverization, and it is desirable to pulverize the coke so that the particles larger than 1 mm in size account for 90 mass % or more of the powder. If the coke is pulverized too much to generate a large amount of fine powder having a diameter of 1 mm or less, problems such as the coke dust stirred up after drying and the increase in burnouts may arise in the subsequent processes such as heating.

It is desirable that the area and aspect ratio of a specific optical structure of the coke are within a specific range. The area and aspect ratio of an optical structure can be calculated by the above-mentioned method. Also, when the calcined coke is obtained as a lump of a few centimeters in size, the lump as obtained is embedded in resin and subjected to mirror-like finishing and the like, and the cross-section is observed by a polarizing microscope to calculate the area and aspect ratio of an optical structure.

In the case where the optical structures are observed in a rectangular field of 480 µm×640 µm in the cross-section of the coke under a polarizing microscope, when areas of the optical structures are accumulated from the smallest structure in an ascending order, an area of an optical structure whose accumulated area corresponds to 60% of the total area of all the optical structures is preferably 50 $\mu m^2$ or more and 5,000 pmt or less, more preferably 100 $\mu m^2$ or more and 3,000 $\mu m^2$ or less, and most preferably 100 $\mu m^2$ or more and 160 $\mu m^2$ or less. When the coke having the area of an optical structure within the above-mentioned range is pulverized and graphitized, a carbon material having the optical structures as described above can be obtained. Since such a carbon material is going to have a fully developed crystal structure, it can retain lithium ions at a higher density. Also, as the crystals develop in a more aligned state in the carbon material, when an electrode is pressed, crystal planes slide over each other by fracture along the crystal plane and the carbon material has a higher degree of freedom for the particle shape, which improves filling property and is preferable.

In the case where the optical structure of the coke is observed in the same way as described above, when the optical structures are counted from a structure of the smallest aspect ratio in an ascending order, the aspect ratio of the structure which ranks at the position of 60% in the total number of all the structures is preferably 1.5 or more and 6 or less, more preferably 2.0 or more and 3.0 or less, and most preferably 2.3 or more and 2.6 or less.

Next, the coke is to be pulverized.

In the case of pulverizing coke by a dry method, grindability is significantly reduced if water is contained in coke at the time of pulverization. Therefore, it is desirable to dry coke at around 100 to 1,000° C., preferably at 100 to 500° C. If coke has high-temperature thermal history, coke has a higher crushing strength, which reduces grindability. In addition, coke having high-temperature thermal history has developed anisotropy in crystals and higher cleavability, and the coke tends to be a flaky powder. There is not particular limit to the method of pulverization, and pulverization can be performed using a known jet mill, hammer mill, roller mill, pin mill, vibration mill or the like.

It is desirable to perform pulverization so that coke powder has a D50 value of from 1.0 µm or more and 15 µm or less. More preferably, pulverization is performed so that coke powder has a D50 value of from 1.0 µm or more and 10 µm or less, still more preferably a D50 value of from 1.0 µm or more and 7 µm or less.

Graphitization is performed at a temperature of 2,400° C. or higher, more preferably 2,800° C. or higher, and still more preferably 3,050° C. or higher, and the most preferably 3,150° C. or higher. The treatment at a higher temperature further promotes the development of the graphite crystals and an electrode having a higher storage capacity of lithium ion can be obtained. On the other hand, if the temperature is too high, it is difficult to prevent the sublimation of the graphite powder and an unnecessarily large amount of energy is required. Therefore, the graphitization is preferably 3,600° C. or lower.

It is desirable to use electric energy to attain the above temperature. Electric energy is more expensive than other heat source and in particular to attain a temperature of 2,000° C. or higher, an extremely large amount of electricity is consumed. Therefore, it is preferable not to consume the electric energy except for graphitization, and to calcine the carbon material prior to the graphitization to remove the organic volatile content: i.e. to make the fixed carbon content be 95% or more, preferably 98% or more, and still more preferably 99% or more. The calcination can be performed by, for example, heating the carbon material at 700 to 1,500° C. Since decrease in mass at the time of graphitization can be reduced by the calcination, a treatment amount at one time of the graphitization treatment apparatus can be increased.

It is preferable that the material is not subjected to pulverizing treatment after graphitization. Note that the material may be de-agglomerated after the graphitization to such a degree that the particles are not pulverized.

When an electrode is manufactured by employing as an active material the graphite particles not subjected to pulverization after graphitization, the active material can be uniformly distributed inside the electrode and the contact between the adjacent particles is stabilized at the time of compressing the electrode. As a result, it is possible to produce a battery suitable for the repeated charging and discharging.

(Carbonaceous Material)

The carbonaceous material in a preferable embodiment of the present invention is different from the above-mentioned artificial graphite particles. The carbonaceous material is a carbon material, in which the crystals formed from carbon atoms have low degree of crystallinity, has a peak in the vicinity of 1360 $cm^{-1}$ measured in a Raman scattering spectrum.

A carbonaceous material can be produced by, for example, carbonizing a carbon precursor. There is no particular limit on the carbon precursor, and preferred are a petroleum-derived substance such as thermal heavy oil, thermally cracked oil, straight asphalt, blown asphalt, and tar obtained as a by-product in producing ethylene, or petroleum pitch; and a coal-derived substance such as coal tar produced in coal carbonization, a heavy component obtained by removing a low-boiling-point component from coal tar by distillation, and coal-tar pitch (coal pitch). Petroleum-based pitch or coal-based pitch is particularly preferable. Pitch is a mixture of multiple polycyclic aromatic compounds. By use of pitch, a carbonaceous material having a small amount of impurities can be produced at a high carbon yield. Since pitch contains less oxygen, the silicon-containing particles are less likely to be oxidized when they are coated with a carbonaceous material.

The softening point of the pitch as a precursor of a carbonaceous material is preferably 80° C. or more and 300°

C. or less. When the softening point of the pitch is too low, the average molecular weight of the polycyclic aromatic compounds constituting the pitch is low and the pitch contains a volatile component in a large amount, resulting in a low carbonization yield and an increase in production cost. Besides, such pitch offers a carbonaceous material having many pores and a large specific surface area. Pitch having too high a softening point has a high viscosity, and hence it tends to be difficult to uniformly disperse silicon-containing particles.

The softening point of the pitch may be measured by a Mettler method described in ASTM-D3104-77.

The residual carbon ratio of the pitch as a precursor of a carbonaceous material is preferably 20 mass % or more and 70 mass % or less, more preferably 25 mass % or more and 60 mass % or less. When the residual carbon ratio is low, the production cost tends to be increased. Besides, such pitch offers a carbonaceous material having a large specific surface area. Pitch having a high residual carbon ratio generally has a high viscosity, and hence it tends to be difficult to be uniformly mixed with silicon-containing particles.

The residual carbon ratio is determined by a method as described below. After pulverization of the pitch in a solid form with a mortar or the like, the pulverized product is subjected to thermal analysis under a nitrogen gas flow. The residual carbon ratio is defined as a ratio of a residual amount at 1,100° C. with respect to a loaded amount. The residual carbon ratio is identical to a fixed carbon content in JIS K2425 measured at a carbonization temperature of 1,100° C.

The QI (quinolone insoluble) content in the pitch used in the present invention is preferably 10 mass % or less, more preferably 5.0 mass % or less, and still more preferably 2.0 mass % or less. The QI content of the pitch is a value corresponding to its free carbon amount. When pitch containing a large amount of free carbon is subjected to heat treatment, the free carbon adheres onto the surfaces of mesophase spheres in the course of appearance of the mesophase spheres, to form a three-dimension network and thus prevent the growth of the spheres. Thus, a mosaic structure is likely to be formed. In contrast, when pitch containing a small amount of free carbon is subjected to the heat treatment, the mesophase spheres grow larger to form needle coke. When the QI content falls within the above-mentioned range, electrode characteristics are more satisfactory.

The TI (toluene insoluble) content in the pitch used in the present invention is preferably 10.0 mass % or less, more preferably 70.0 mass % or less. In a pitch having a small TI content, the average molecular weight of the polycyclic aromatic compounds constituting the pitch is low and the pitch contains the volatile component in a large amount, resulting in a low carbonization yield and an increase in production cost. Besides, such pitch offers a carbonaceous material containing many pores and having a large specific surface area. A pitch having a large TI content has an advantage of a high carbonization yield by virtue of a high average molecular weight of the polycyclic aromatic compounds constituting the pitch, but in general, pitch having a large TI content has a high viscosity, and hence it tends to be difficult to be uniformly mixed with silicon-containing particles. When the TI content falls within the above-mentioned range, pitch and the other components can be uniformly mixed, and a negative electrode material exhibiting suitable characteristics as the active material for a battery can be obtained.

The QI content and TI content of the pitch used in the present invention may be measured by a method disclosed in JIS K2425 or a method in conformity thereto.

The amount of the carbonaceous material is preferably 2.0 mass % or more and 40.0 mass % or less, more preferably 4.0 mass % or more and 30.0 mass % or less with respect to the total of the above-mentioned silicon-containing particles, artificial graphite particles and carbonaceous material.

When the carbonaceous material amount is less than 2.0 mass %, the silicon-containing particles and the artificial graphite particles are not to be fully bonded. In addition, since the surface of the silicon-containing particles cannot be coated with the carbonaceous material, it will make it difficult to impart conductivity to Si. It also reduces an effect of suppressing the surface reactivity of Si and an effect of reducing the expansion and contraction of Si, resulting in reduction of cycle characteristics. On the other hand, when the carbonaceous material amount exceeds 40.0 mass %, the initial efficiency shows tendency to decrease depending on the carbonaceous material amount.

(Negative Electrode Material for Lithium-Ion Batteries)

It is desirable that the negative electrode material in an embodiment of the present invention comprises silicon-containing particles, artificial graphite particles, and a carbonaceous material; and at least part of the silicon-containing particles, artificial graphite particles, and a carbonaceous material are integrated with each other to thereby form composite particles. Integration includes, for example, a state in which the silicon-containing particles and the artificial graphite particles are fixed by the carbonaceous material to be bonded to form composite particles; and a state in which the silicon-containing particles and/or the artificial graphite particles are coated with the carbonaceous to thereby form composite particles. In the present invention, it is desirable that the silicon-containing particles are completely coated with the carbonaceous material in such a state that Si is not exposed. Above all, preferred are a state in which the silicon-containing particles and the artificial graphite particles are bonded with each other through the carbonaceous material, and the whole joined particles are coated by a carbonaceous material to form composite particles; and a state in which the silicon-containing particles are in direct contact with the artificial graphite particles, and the whole particles are coated by a carbonaceous material to form composite particles. By preventing the surface of the silicon-containing particles from being exposed when they are used as a negative electrode material in a battery, the electrolyte decomposition reaction can be suppressed to thereby maintain the coulomb efficiency high. In addition, by joining the artificial graphite particles and the silicon-containing particles through a carbonaceous material, the conductivity therebetween can be increased. Furthermore, by making the silicon-containing particles to be coated with a carbonaceous material, the volume strain in association with expansion and contraction of the silicon-containing particles can be eased.

In the negative electrode material in an embodiment of the present invention, artificial graphite particles, a carbonaceous material, or silicon-containing particles, which are not integrated, may be singly contained. It would be better that the artificial graphite particles, a carbonaceous material, or silicon-containing particles, which are not integrated, are contained in the negative electrode material in a smaller amount. Specifically, the amount is preferably 10 mass % or less with respect to the mass of the negative electrode material.

In the negative electrode material in an embodiment of the present invention, a 50% particle diameter in a volume-based cumulative particle size distribution by laser diffraction method, D50, is preferably 2.0 μm or more and 18.0 μm or less, more preferably 4.0 μm or more and 10.0 μm or less. When D50 is less than 2.0 μm, the production of the negative electrode material will be economically less sufficient. In addition, it is difficult to handle the material due to reduction in the coating processability, which may require a binder in a larger amount or make it difficult to increase the electrode density. D50 of less than 2.0 μm will result in an excessively large specific surface area, and the initial charge-discharge efficiency will be reduced due to side reaction with an electrolyte. On the other hand, if the D50 value exceeds 18 μm, the input-output characteristics is reduced; the distribution uniformity in an electrode is reduced; or the cycle characteristics is reduced. That is, by setting D50 within the above-mentioned range, it becomes possible to obtain a negative electrode material having good initial charge-discharge efficiency, input-output characteristics and cycle characteristics, with high economic efficiency.

In the negative electrode material in an embodiment of the present invention, BET specific surface area is preferably 2.0 m$^2$/g or more and 10.0 m$^2$/g or less, more preferably 4.0 m$^2$/g or more and 8.0 m$^2$/g or less. When the BET specific surface area is less than 2.0 m$^2$/g, the input-output characteristics is reduced, or the cycle characteristics is reduced due to decrease in the distribution uniformity in the electrode in some cases. When the BET specific surface area exceeds 10.0 m$^2$/g, it is difficult to handle the material due to reduction in the coating processability, which may require a binder in a larger amount, make it difficult to increase the electrode density, or result in decrease in the initial charge-discharge efficiency due to side reaction with an electrolyte. Furthermore, if the surface of Si is exposed due to excessive pulverization of the composite material, it will decrease an effect of inhibiting the surface activity and an effect of easing of the expansion and contraction of the silicon-containing particles, and the cycle characteristics shows a tendency to decrease.

In the negative electrode material in an embodiment of the present invention, an average interplanar spacing (002) plane of graphite particles by the X-ray diffraction method, d002, is preferably 0.3360 nm or less. This increases the amount of lithium ions to be intercalated and desorbed per mass of the artificial graphite particles in the negative electrode material; i.e. increases the weight energy density of the negative electrode material as well. Further, this suppresses electrode expansion and contraction in association with intercalation and deintercalation of lithium ions in Si in the negative electrode material, and the cycle life is improved.

In the negative electrode material in an embodiment of the present invention, an R value ($I_D/I_G$) is preferably 0.15 or more and 1.00 or less, more preferably 0.20 or more and 1.00 or less, still more preferably 0.40 or more and 1.00 or less, which value is the ratio between the peak intensity (peak height) $I_D$ of a peak within the range of 1300 to 1400 cm$^{-1}$ and the peak intensity (peak height) $I_G$ of a peak within the range of 1580 to 1620 cm$^{-1}$ measured by Raman spectroscopy spectra. An excessively low R value means that the surface of the artificial graphite particles is not fully covered by a coating layer made of a carbonaceous material including a silicon-containing particles. Therefore, when the R value is less than 0.15, the bonding between the artificial graphite particles and the silicon-containing particles is not sufficient, and it is difficult to obtain an effect of imparting conductivity to the silicon-containing particles. Also, it decreases an effect due to the coating layer of the carbonaceous material of inhibiting the surface activity and an effect of easing of the expansion and contraction of the silicon-containing particles, and the cycle characteristics shows a tendency to decrease. On the other hand, an excessively high R value means that the negative electrode material contains amorphous carbon having a large initial irreversible capacity in a large amount and the carbon covers the surface of the artificial graphite particles. Accordingly, when the R value exceeds 1.00, the initial discharge efficiency shows a tendency to decrease.

Method of Producing a Negative Electrode

The negative electrode material in an embodiment of the present invention comprises silicon-containing particles, artificial graphite particles and a carbonaceous material, and it is desirable that at least a part of the silicon-containing particles, the artificial graphite particles and the carbonaceous material are integrated with each other to thereby form composite particles. A negative electrode material having such a structure can be manufactured according to a known method.

For example, a negative electrode material can be obtained by a method of mixing silicon-containing particles, artificial graphite particles and a precursor of a carbonaceous material and by subjecting the obtained mixture to heat treatment to thereby change the precursor to a carbonaceous material.

The mixture of silicon-containing particles, artificial graphite particles and a precursor of a carbonaceous material can be obtained by, for example, melting pitch as being one of the carbon precursors, mixing the molten pitch with silicon-containing particles in an inert atmosphere, and then mixing the mixture of the silicon-containing particles and artificial graphite particles with a carbon precursor, and conducting mechanochemical treatment; or by dissolving a carbon precursor in a solvent, adding silicon-containing particles and artificial graphite particles thereto to be mixed in a liquid phase, followed by pulverization. For the mechanochemical treatment, a known device such as Hybridizer (trademark) manufactured by Nara Machinery Co., Ltd. can be used.

A known device such as a ball mill, jet mill, rod mill, pin mill, rotary cutter mill, hammer mill, atomizer and mortar can be used for pulverization and mixing. It is desirable to employ a method that can prevent the increase in the oxidation degree of the silicon-containing particles. Generally, it is thought that the oxidation is facilitated in particles with a small diameter that have a large specific surface area. Therefore, preferred is a device that pulverizes particles with a large diameter preferentially, and will not make much progress in pulverization of particles with a small diameter. For example, by use of a device that performs pulverization mainly by impact such as a rod mill and a hammer mill, the impact force tends to be transmitted preferentially to particles with a large diameter, and less impact is to be delivered to particles with a small diameter. By use of a device that performs pulverization mainly by impact and shear, the shear force tends to be transmitted preferentially to particles with a large diameter, and less shear is to be delivered to particles with a small diameter. Through pulverization and mixing without the progress in the oxidization of silicon-containing particles by using such a device, the negative electrode material of the present invention can be obtained.

To inhibit the progress of the Si oxidation, it is desirable to perform pulverization and mixing in a non-acidic atmosphere. Examples of the non-acidic atmosphere include an atmosphere filled with an inert gas such as an argon gas and a nitrogen gas.

The heat treatment to convert a carbon precursor to a carbonaceous material is performed at a temperature of preferably 200° C. or more and 2000° C. or less, more preferably 500° C. or more and 1500° C. or less, particularly preferably 600° C. or more and 1200° C. or less. By the heat treatment, a carbonaceous material can cover silicon-containing particles and/or artificial graphite particles to give a form in which a carbonaceous material enters between the silicon-containing particles, between the artificial graphite particles, or between the silicon-containing particles and the artificial graphite particles to thereby join the particles. When the heat treatment temperature is too low, the carbonization of a carbon precursor will not be fully completed. As a result, hydrogen and oxygen remain in the negative electrode material, and may adversely affect the battery characteristics. On the other hand, when the heat treatment temperature is too high, it will promote the crystallization excessively to thereby reduce the charging characteristics, or silicon and carbon are bonded to each other to thereby generate an inactive state against Li ions in some cases. The heat treatment is preferably conducted under a non-acidic atmosphere. Examples of the non-acidic atmosphere include an atmosphere filled with an inert gas such as an argon gas and a nitrogen gas. Particles are aggregated due to fusion by the heat treatment in some cases, it is desirable to crash the product subjected to heat treatment to be used as an electrode active material. As a crashing method, preferred is a pulverizer using an impact force such as a hammer, and a jet mill using the impact between the crashed products.

Paste for Negative Electrode

A paste for a negative electrode according to one embodiment of the present invention contains the negative electrode material, a binder, and a solvent, and as required, a conductive assistant or the like. The paste for a negative electrode is obtained by, for example, mixing and kneading the negative electrode material, the binder, and the solvent, and as required, the conductive assistant or the like. The paste for a negative electrode may be formed into a sheet shape, a pellet shape, or the like.

A binder is not particularly limited and examples thereof include polyethylene, polypropylene, an ethylene propylene terpolymer, butadiene rubber, styrene butadiene rubber, butyl rubber, acrylic rubber, and a polymer compound having a large ionic conductivity. Examples of the polymer compound having a large ionic conductivity include polyvinylidene fluoride, polyethylene oxide, polyepichlorohydrin, polyphosphazene, and polyacrylonitrile. The amount of the binder is preferably 0.5 part by mass or more and 100 parts by mass or less with respect to 100 parts by mass of the negative electrode material.

The conductive assistant is not particularly limited as long as the conductive assistant plays a role in imparting conductivity and electrode stability (buffering action on a volume change through intercalation and deintercalation of lithium ions) to the electrode. Examples thereof include carbon nanotubes, carbon nanofiber, vapor grown carbon fibers (e.g., "VGCF (trademark)" manufactured by Showa Denko K.K.), and conductive carbon (e.g., "DENKA BLACK (trademark)" manufactured by Denki Kagaku Kogyo Kabushiki Kaisha, "Super C65" manufactured by TIMCAL, "Super C45" manufactured by TIMCAL, or "KS6L" manufactured by TIMCAL). The amount of the conductive assistant is preferably 10 parts by mass or more and 100 parts by mass or less with respect to 100 parts by mass of the negative electrode material.

The solvent is not particularly limited, and examples thereof include N-methyl-2-pyrrolidone, dimethylformamide, isopropanol, and water. In the case of a binder using water as a solvent, a thickening agent is preferably used in combination. The amount of the solvent is adjusted so that the paste achieves such viscosity that the paste is easily applied onto a current collector.

Negative Electrode Sheet

A negative electrode sheet according to one embodiment of the present invention includes a current collector and an electrode layer for coating the current collector.

Examples of the current collector include a nickel foil, a copper foil, a nickel mesh, and a copper mesh.

The electrode layer contains a binder and the negative electrode material. The electrode layer may be obtained by, for example, applying the paste, followed by drying. A method of applying the paste is not particularly limited. The thickness of the electrode layer is generally from 50 µm to 200 µm. When the thickness of the electrode layer is too large, the negative electrode sheet cannot be accommodated in a standardized battery container in some cases. The thickness of the electrode layer may be adjusted by the application amount of the paste. In addition, the thickness may also be adjusted by performing pressure forming after drying the paste. As a method for the pressure forming, there is given a forming method, such as roll pressing or plate pressing, and the like. A pressure during the pressure forming is preferably from about 1 ton/cm$^2$ to about 5 ton/cm$^2$.

The electrode density of the negative electrode sheet may be calculated as described below. Specifically, the negative electrode sheet after the press forming is punched into a circular shape having a diameter of 16 mm, and its mass is measured. In addition, the thickness of an electrode is measured. The mass and thickness of the electrode layer can be understood by subtracting therefrom the mass and thickness of a current collector foil separately measured, and the electrode density is calculated based on the obtained values.

Lithium Ion Battery

A lithium ion battery according to one embodiment of the present invention includes at least one selected from the group consisting of a non-aqueous electrolytic solution and a non-aqueous polymer electrolyte, a positive electrode sheet, and the negative electrode sheet.

A positive electrode sheet which has hitherto been used for a lithium ion battery, specifically, a sheet including a positive electrode active material may be used as the positive electrode sheet to be used in the present invention. Examples of the positive electrode active material include $LiNiO_2$, $LiCoO_2$, $LiMn_2O_4$, $LiNi_{0.34}Mn_{0.33}Co_{0.33}O_2$, and $LiFePO_4$.

The non-aqueous electrolytic solution and the non-aqueous polymer electrolyte used for the lithium ion battery are not particularly limited. Examples thereof include: organic electrolytic solutions each obtained by dissolving a lithium salt, such as $LiClO_4$, $LiPF_6$, $LiAsF_6$, $LiBF_4$, $LiSO_3CF_3$, $CH_3SO_3Li$, or $CF_3SO_3Li$, into a non-aqueous solvent, such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, or γ-butyrolactone; gel polymer electrolytes each containing polyethylene oxide, polyacrylonitrile, polyvinylidene fluoride, polymethyl methacrylate, or the like; and a solid polymer electrolyte containing, for example, a polymer having an ethylene oxide bond.

In addition, a substance for causing a decomposition reaction in initial charging of the lithium ion battery may be added in a small amount to the electrolytic solution. Examples of the substance include vinylene carbonate (VC), biphenyl, propanesultone (PS), fluoroethylene carbonate (FEC), and ethylene sultone (ES). The addition amount thereof is preferably 0.01 mass % or more and 50 mass % or less.

In the lithium ion battery of the present invention, a separator may be arranged between the positive electrode sheet and the negative electrode sheet. Examples of the separator include non-woven fabric, cloth, and a microporous film each containing as a main component a polyolefin, such as polyethylene or polypropylene, and a combination thereof.

The lithium ion battery of the present invention can be used as a power source of electronic devices such as mobile phones, mobile personal computers, and Personal Digital Assistant (PDA); a power source of electric devices such as an electric drill, a vacuum cleaner, and an electric vehicle; and used for storage of power obtained by fuel cells, photovoltaic generation, and wind generation.

EXAMPLES

Hereinafter, the present invention is described in more detail by way of typical examples. It should be noted that these examples are merely for illustrative purposes, and the present invention is not limited thereto.

Materials used in the examples to be described later are given below.

(1) Silicon-containing particles (A1)
Diameter, Day, defined by the following equation: 50 nm $$d_{av}=6/(\rho \times BET)$$

On the assumption that the fine particles are dense spheres having an average diameter $d_{av}$
BET: BET specific surface area ($m^2/g$) based on nitrogen adsorption (51.5 $m^2/g$)
ρ: true density of silicon particles (2.33 $g/cm^3$ as a theoretical value)
Oxygen content in the Si fine particles measured with inductively coupled plasma (ICP): 5.8 mass %

By observing the silicon-containing particles with an electron microscope at 100,000-fold magnification, and a quantification by image analysis of 200 primary particle randomly selected showed that D50 diameter in a number-based accumulated distribution was 48 nm and 90% diameter was 182 nm.

(2) Pitch
Petroleum pitch (softening point: 220° C.). Measurement by thermal analysis under a nitrogen gas flow showed that this petroleum pitch had a residual carbon ratio of 52% at 1,100° C.

The QI content and TI content of the petroleum pitch measured by a method disclosed in JIS K2425 or a method in conformity thereto were 0.62% and 48.9%, respectively.

Various physical properties in Examples are measured by the following methods.

(Particle Diameter)
Two micro spatulas of powder and two drops of a nonionic surfactant (TRITON(trademark)-X; manufactured by Roche Applied Science) were added to 50 ml of water, and ultrasonically dispersed for 3 minutes. The dispersion was loaded in a laser diffraction particle size distribution measuring apparatus (LMS-2000e) manufactured by Seishin Enterprise Co., Ltd. and a volume-based cumulative particle size distribution was measured.

Raman R Value

The measurement was performed under the conditions of an excitation wavelength of 532 nm, an entrance slit width of 200 µm, an exposure time period of 15 seconds, a number of times of integration of 2, and a number of diffraction grating lines per millimeter of 600 through use of a laser Raman spectrometer (NRS-3100) manufactured by JASCO Corporation. The ratio ($I_D/I_G$) of a peak intensity $I_D$ (derived from an amorphous component) around 1,360 $cm^{-1}$ to a peak intensity $I_G$ (derived from a graphite component) around 1,580 $cm^{-1}$ was calculated from the measured spectrum. The calculated value was defined as an R value and used as an indicator of a graphitization degree.

Specific Surface Area

The specific surface area was measured according to the multipoint BET method by Surface Area & Pore Size Analyzer/NOVA 4200e produced by Quantachrome Instruments using nitrogen gas as a probe gas under a relative pressure of 0.1, 0.2 and 0.3.

Powder XRD Measurement

Carbon powder samples were filled in a sample plate made of glass (recessed portion of a sample plate: 18×20 mm, depth: 0.2 mm) and subjected to measurement under the following conditions:
XRD apparatus: SmartLab manufactured by Rigaku
X-ray type: Cu-Kα ray
Method for removing Kβ ray: Ni filter
X-ray output: 45 kV, 200 mA
Measurement range: 5.0 to 10.0 deg.
Scanning speed: 10.0 deg./min.

Profile fitting was performed by smoothing the obtained waveform, removing the background, and removing Kα2.

The interlayer spacing d002 and the crystallite size Lc along a c-axis were determined from a 002 diffraction line in powder X-ray diffraction.

From the obtained $I_{004}$ as the peak intensity of (004) plane and $I_{110}$ as the peak intensity of (110) plane, the peak intensity ratio $I_{110}/I_{004}$ as an index of orientation was calculated. As a peak on each plane, the highest intensity within the range as described below was selected, respectively.
(004) plane: 54.0 to 55.0 deg.
(110) plane: 76.5 to 78.0 deg.

Measurement of an Average Circularity

The carbon material was purified by allowing it to pass through a filter with 106 µm openings to remove fine refuse. 0.1 g of the obtained sample was added to 20 ml of ion-exchanged water and uniformly dispersed by adding 0.1 to 0.5 mass % of surfactant to prepare the sample solution for the measurement. The dispersion was performed by treating the mixture for five minutes using ultrasonic washing machine UT-105S (manufactured by Sharp Manufacturing Systems Corporation).

The obtained sample solution for the measurement was put in a flow-type particle image analyzer FPIA-2100 (manufactured by Sysmex Corporation) and 10,000 particles were subjected to image analysis in the LPF mode. The median value of the obtained circularity of each particle was taken as an average circularity.

Measurement of Pore Volume

About 5 g of a carbon material was weighed out in a cell made of glass, and after drying it under reduced pressure of 1 kPa or less at 300° C. for about 3 hours to remove adsorbed components such as water, the mass of the carbon material was measured. Subsequently, the nitrogen-gas adsorption isotherm of the dried carbon material in liquid nitrogen cooling was measured by Autosorb-1 manufactured by Quantachrome Instruments. A total pore volume of pores having a diameter of 0.4 µm or less was determined from the nitrogen adsorption amount at the measurement points of P/P0=0.992 to 0.995 on the obtained adsorption isotherm and the mass of the graphite powder after drying.

Production of Positive Electrode Sheet 90 g of $LiCoO_2$, 5 g of carbon black (manufactured by TIMCAL) serving as a conductive assistant, and 5 g of polyvinylidene fluoride (PVdF) serving as a binder were stirred and mixed while N-methyl-pyrrolidone was appropriately added thereto. Thus, a slurry paste for a positive electrode was obtained.

The paste for a positive electrode was applied onto an aluminum foil having a thickness of 20 µm with a roll coater, followed by drying, to yield a sheet for a positive electrode. The electrode after the drying was pressed to a density of 3.6 g/cm with a roll press. Thus, a positive electrode sheet for battery evaluation was obtained.

Production of Negative Electrode Sheet

Styrene butadiene rubber (SBR) and carboxymethylcellulose (CMC) were used as binders. Specifically, an aqueous solution in which SBR was dispersed in a solid content of 40% and an aqueous solution in which a solid content of CMC powder was dissolved were prepared.

Carbon black and a vapor grown carbon fiber (VGCF (trademark)-H, manufactured by Showa Denko K.K.) were prepared as conductive assistants, and a mixed conductive assistant obtained by mixing those assistants at a ratio of 3:2 (mass ratio) was used.

90 Parts by mass of each composite produced in Examples and Comparative Examples, 5 parts by mass of the mixed conductive assistant, the CMC solution containing 2.5 parts by mass of a solid content, and the SBR solution containing 2.5 parts by mass of a solid content were mixed, and an appropriate amount of water was added thereto for viscosity adjustment, followed by kneading with a planetary centrifugal mixer. Thus, a paste for a negative electrode was obtained.

The paste for a negative electrode was uniformly applied onto a copper foil having a thickness of 20 µm with a doctor blade so as to achieve a thickness of 150 µm, followed by drying with a hot plate and then vacuum drying. Thus, a sheet for a negative electrode was obtained. The electrode after the drying was pressed with a uniaxial press machine at a pressure of 3 ton/cm². Thus, a negative electrode sheet for battery evaluation was obtained.

Capacity Ratio of Positive Electrode to Negative Electrode

When a lithium ion battery is produced by allowing a positive electrode sheet and a negative electrode sheet to face each other, it is necessary to consider balance between the capacities of the electrodes. That is, when the capacity of a negative electrode, which is a lithium ion accepting side, is too low, Li excessively precipitates on the negative electrode side to cause deterioration in cycle characteristics. In contrast, when the capacity of the negative electrode is too high, an energy density is reduced through charge and discharge in a low load state, while the cycle characteristics are improved. In order to prevent the foregoing, the discharge amount of the negative electrode sheet per weight of an active material was evaluated in advance in a half cell using Li as a counter electrode, and the capacity of the negative electrode sheet was finely adjusted so that the ratio of the capacity of the negative electrode sheet ($Q_A$) to the capacity of the positive electrode sheet ($Q_C$) was a constant value of 1.2, while the same positive electrode sheet was used.

(Production of Battery for Evaluation)

The following operation was performed in a glove box in which a dry argon gas atmosphere having a dew point of −80° C. or less was retained.

[Two-Electrode Cell]

The negative electrode sheet and the positive electrode sheet were punched to yield a negative electrode piece and a positive electrode piece each having an area of 20 cm², respectively. An Al tab and a Ni tab were attached to the Al foil of the positive electrode piece and the Cu foil of the negative electrode piece, respectively. A film microporous membrane made of polypropylene was sandwiched between the negative electrode piece and the positive electrode piece, and the resultant was packed in an aluminum laminate in this state. In addition, an electrolytic solution was injected thereinto. After that, an opening was sealed through heat fusion. Thus, a battery for evaluation was produced. It should be noted that the electrolytic solution was a solution obtained by mixing 1 mass % of vinylene carbonate (VC) and 30 mass % of fluoroethylene carbonate (FEC) with a solvent obtained by mixing ethylene carbonate, ethyl methyl carbonate, and diethyl carbonate at a ratio of 3:5:2 in terms of volume ratio, and further dissolving therein $LiPF_6$ as an electrolyte at a concentration of 1 mol/L.

[Lithium Counter Electrode Cell]

In a cell case (inner diameter: about 18 mm) with a screwed-type lid made of polypropylene, the above negative electrode and a metal lithium foil punched out into a size of 16 mmΦ were sandwiched and stacked between separators (microporous films made of polypropylene (Cell Guard 2400)). An electrolyte was added into the cell case to obtain a cell for testing. It should be noted that the electrolytic solution was a solution obtained by mixing 1 mass % of fluoroethylene carbonate (FEC) with a solvent obtained by mixing ethylene carbonate, ethyl methyl carbonate, and diethyl carbonate at a ratio of 3:5:2 in terms of volume ratio, and further dissolving therein $LiPF_6$ as an electrolyte at a concentration of 1 mol/L.

(Measurement Tests of Discharge Capacity and Initial Coulomb Efficiency)

Tests were conducted using a lithium counter electrode cell. Constant current (CC) charging was performed a current of 0.1 C from a rest potential to 0.005 V. Next, the charging was switched to constant voltage (CV) charging at 0.005 V with a cut-off current value of 0.005 C.

A discharging was performed in the constant-current mode at a current of 0.1 C with an upper limit voltage of 1.5 V.

The test was performed in a thermostatic chamber set at 25° C. At that time, the capacity at the initial discharging was defined as an initial discharge capacity. Also, the ratio of the electricity of the initial charge and discharge, i.e. discharge electricity quantity/charge electricity quantity in percentage was defined as an index of the initial coulomb efficiency.

(Charge-Discharge Cycle Test)

A test was conducted using a two-electrode cell. Aging was performed by repeating charge and discharge 5 times at a current value of 0.2 C, and then a charge-discharge cycle test was performed by the following method.

The charging was performed at an upper limit voltage of 4.2 V in a constant current (CC) mode at a current value of 1 C and a constant voltage (CV) mode at a cut-off current of 0.05 C.

The discharging was performed at a lower limit voltage of 2.8 V in a CC mode at a current value of 1 C.

The charging and discharging operations were performed 100 cycles when the above-mentioned charging and discharging operations were defined as 1 cycle, and a discharge amount retention rate after the Nth cycle defined by the following equation was calculated.

(Discharge amount retention rate after $N$th cycle (%))=(discharge capacity in $N$th cycle)/(discharge capacity in initial cycle)×100

Example 1

A crude oil produced in Liaoning, China (28° API, wax content of 17% and sulfur content of 0.66%) was distilled under ordinary pressure. Using a Y-type zeolite catalyst in a sufficient amount against the heavy fraction, catalytic cracking in a fluidized bed was performed at 510° C. under ordinary pressure. A solid content such as a catalyst was centrifugally separated until the obtained oil became clear to thereby obtain decant oil. The oil was subjected to a small-sized delayed coking process. After keeping the drum inlet temperature at 505° C. and the drum internal pressure to 600 kPa (6 kgf/cm$^2$) for ten hours, the drum was water-cooled to obtain black chunks. After pulverizing the obtained black chunks into pieces up to five centimeters in size with a hammer, they were dried in a kiln at 200° C. The resultant was obtained as coke 1.

Coke 1 was pulverized with a bantam mill produced by Hosokawa Micron Corporation and subsequently coarse powder was excluded with a sieve having a mesh size of 45 µm. The pulverized coke was further pulverized with a jet mill manufactured by Seishin Enterprise Co., Ltd. Next, the pulverized coke is subjected to air classification with Turboclassifier TC-15N produced by Nisshin Engineering Inc. to obtain a powder coke 1 (D50=6.3 µm), substantially containing no particles each having a particle diameter of 1.0 µm or less.

A graphite crucible was filled with the powder coke 1 and subjected to heat treatment for one week so that the maximum achieving temperature in Acheson furnace was adjusted to about 3,300° C. to obtain artificial graphite particles (B1) that are not flaky. The crucible was provided with multiple oxygen inlets. Table 1 shows various physical properties of the obtained artificial graphite particles (B1) that are not flaky. The artificial graphite particles had D50 of 6.4 µm, a BET specific surface area of 6.1 m$^2$/g, d002 of 0.3357 nm, Lc of 104 nm, a total pore volume of 32.00 g, an average circularity of 0.88, and an orientation index, $I_{110}/I_{004}$, of 0.28.

Next, 10.0 parts by mass of the above-mentioned silicon-containing particles and 11.5 parts by mass of the above-mentioned petroleum pitch were charged in a separable flask. A nitrogen gas was allowed to flow therein to maintain an inert atmosphere, and the temperature of flask was raised to 250° C. The content was stirred by a mixer rotating at 500 rpm to thereby uniformly mix the pitch and the silicon-containing particles A1. The resultant was cooled to be solidified to obtain a mixture.

86.0 parts by mass of the above-mentioned artificial graphite particles (B1) was added to the mixture and charged in a rotary cutter mill. The resultant was stirred at a speed as high as 25000 rpm, while maintaining an inert atmosphere by allowing a nitrogen gas to flow, to be mixed.

The mixture was placed in a sintering furnace, heated to 1100° C. at a temperature increase rate of 150° C./h, and maintained at 1100° C. for one hour. The mixture was cooled to room temperature and taken out of the furnace. After pulverizing the mixture by a rotary cutter mill, the pulverized product was sieved with a sieve having a mesh size of 45 µm. The undersize product was obtained as composite material (1).

Table 2 shows the results of evaluating powder properties and battery properties of the composite material (1).

Example 2

Coke 1 described in Example 1 was pulverized with a bantam mill produced by Hosokawa Micron Corporation and subsequently coarse powder was excluded with a sieve having a mesh size of 45 µm. The pulverized coke 1 was further pulverized with a jet mill manufactured by Seishin Enterprise Co., Ltd. Next, the pulverized coke is subjected to air classification with Turboclassifier TC-15N produced by Nisshin Engineering Inc. to obtain a powder coke 2 (D50=12.0 µm), substantially containing no particles each having a particle diameter of 1.0 µm or less.

A graphite crucible was filled with the powder coke 2 and subjected to heat treatment for one week so that the maximum achieving temperature in Acheson furnace was adjusted to about 3,300° C. to obtain artificial graphite particles (B2) that are not flaky. The crucible was provided with multiple oxygen inlets. Table 1 shows various physical properties of the obtained artificial graphite particles (B2) that are not flaky. The artificial graphite particles had D50 of 12.2 µm, a BET specific surface area of 2.5 m$^2$/g, d002 of 0.3357 nm, Lc of 108 nm, a total pore volume of 10.5 µl/g, an average circularity of 0.89, and an orientation index, $I_{110}/I_{004}$, of 0.11.

Subsequently, composite material (2) was obtained in the same way as in Example 1 except that the artificial graphite particles (B2) were used instead of the artificial graphite particles (B1).

Table 2 shows the results of evaluating powder properties and battery properties of the composite material (2).

Example 3

A graphite crucible was filled with the powder coke 2 described in Example 2 and subjected to heat treatment for one week so that the maximum achieving temperature in Acheson furnace was adjusted to about 3,300° C. to obtain artificial graphite particles (B3) that are not flaky. Table 1 shows various physical properties of the obtained artificial graphite particles (B3) that are not flaky. The artificial graphite particles had D50 of 12.2 μm, a BET specific surface area of 1.0 m$^2$/g, d002 of 0.3357 nm, Lc of 108 nm, a total pore volume of 5.0 μl/g, an average circularity of 0.89, and an orientation index, $I_{110}/I_{004}$, of 0.11.

Subsequently, composite material (3) was obtained in the same way as in Example 1 except that the artificial graphite particles (B3) were used instead of the artificial graphite particles (B1).

Table 2 shows the results of evaluating powder properties and battery properties of the composite material (3).

Comparative Example 1

Coke 1 described in Example 1 was calcined by heating in a rotary kiln (external-heating type with an electrical heater; aluminum oxide SSA-S; Φ 120 mm inner tube) in which the outer wall temperature in the center of the inner tube is set at 1,450° C. by adjusting the feeding rate of the coke and tilting angle of the inner tube so as to set the residence time to 15 minutes to thereby obtain calcined coke 1.

The calcined coke 1 was pulverized with a bantam mill produced by Hosokawa Micron Corporation and subsequently coarse powder was excluded with a sieve having a mesh size of 45 μm. The pulverized coke was further pulverized with a jet mill manufactured by Seishin Enterprise Co., Ltd. Next, the pulverized coke is subjected to air classification with Turboclassifier TC-15N produced by Nisshin Engineering Inc. to obtain a powder calcined coke 1, substantially containing no particles each having a particle diameter of 1.0 μm or less.

A graphite crucible was filled with the powder coke 1 and subjected to heat treatment for one week so that the maximum achieving temperature in Acheson furnace was adjusted to about 3,300° C. to obtain artificial graphite particles (B4) that are flaky. The crucible was provided with multiple oxygen inlets. Table 1 shows various physical properties of the obtained artificial graphite particles (B4) that are flaky. The artificial graphite particles had D50 of 19.3 μm, a BET specific surface area of 2.1 m$^2$/g, d002 of 0.3357 nm, Lc of 105 nm, a total pore volume of 9.2 μl/g, an average circularity of 0.83, and an orientation index, $I_{110}/I_{004}$, of 0.04.

Subsequently, composite material (4) was obtained in the same way as in Example 1 except that the artificial graphite particles (B4) were used instead of the artificial graphite particles (B1).

Table 2 shows the results of evaluating powder properties and battery properties of the composite material (4).

Comparative Example 2

Table 1 shows the results of the measurement of various physical properties of spherical natural graphite particles (B5) serving as graphite particles. The graphite particles had D50 of 16.8 μm, d002 of 0.3355 nm, a BET specific surface area of 1.8 m$^2$/g, Lc of 109 nm, a total pore volume of 0.13 μl/g, an average circularity of 0.92, and an orientation index, $I_{110}/I_{004}$, of 0.29.

Subsequently, composite material (5) was obtained in the same way as in Example 1 except that the spherical natural graphite particles (B5) were used instead of the artificial graphite particles (B1).

Table 2 shows the results of evaluating powder properties and battery properties of the composite material (5).

Comparative Example 3

Table 1 shows the results of the measurement of various physical properties of graphitized mesocarbon microbeads (B6) serving as graphite particles. The graphitized mesocarbon microbeads had D50 of 16.2 μm, d002 of 0.3365 nm, a BET specific surface area of 1.5 m$^2$/g, Lc of 60 nm, a total pore volume of 9.3 μl/g, an average circularity of 0.97, and an orientation index, $I_{110}/I_{004}$, of 0.65.

Subsequently, composite material (6) was obtained in the same way as in Example 1 except that graphitized mesocarbon microbeads (B6) were used instead of the artificial graphite particles (B1).

Table 2 shows the results of evaluating powder properties and battery properties of the composite material (6).

Comparative Example 4

Table 1 shows the results of the measurement of various physical properties of aggregated graphite (B7) serving as graphite particles. The aggregated graphite had D50 of 3.0 μm, d002 of 0.3365 nm, a BET specific surface area of 1.4 m$^2$/g, Lc of 65 nm, a total pore volume of 11.8 μl/g, an average circularity of 0.90, and an orientation index, $I_{110}/I_{004}$, of 0.38.

Subsequently, composite material (7) was obtained in the same way as in Example 1 except that aggregated graphite (B7) was used instead of the artificial graphite particles (B1).

Table 2 shows the results of evaluating powder properties and battery properties of the composite material (7).

Comparative Example 5

Table 1 shows the results of the measurement of various physical properties of small-particle aggregated graphite (B8) serving as graphite particles. The aggregated graphite had D50 of 6.2 μm, d002 of 0.3363 nm, a BET specific surface area of 3.2 m$^2$/g, Lc of 65 nm, a total pore volume of 25.0 μl/g, an average circularity of 0.90, and an orientation index, $I_{110}/I_{004}$, of 0.48.

Subsequently, composite material (8) was obtained in the same way as in Example 1 except that the small-particle aggregated graphite (B8) was used instead of the artificial graphite particles (B1).

Table 2 shows the results of evaluating powder properties and battery properties of the composite material (8).

Comparative Example 6

Composite material (9) was obtained in the same way as in Example 2 except that silicon-containing particles (A2) having a number-based average primary particle diameter of 50 nm, a BET specific surface area of 5.2 m$^2$/g, and an oxygen content of 2.6 mass % in the Si fine particles measured with inductively coupled plasma (ICP) were used instead of the silicon-containing particles (A1) used in Example 2.

Table 2 shows the results of evaluating powder properties and battery properties of the composite material (9).

Comparative Example 7

A mixed material (10) was obtained without adding petroleum pitch in Example 2: i.e. by simply mixing silicon-containing particles and artificial graphite particles (B2).

Table 2 shows the results of evaluating powder properties and battery properties of the mixed material (10).

Comparative Example 8

In Example 2, 78.0 parts by mass of artificial graphite particles (B2) was mixed in a mixture obtained by uniformly hot-melt mixing of 24.0 parts by mass of the petroleum pitch with the silicon-containing particles, followed by sintering. The sintered product was repeatedly pulverized with a rotary cutter mill. The pulverization was repeated until the specific surface area of the undersize product after sieving operation reached 10.1 m$^2$/g to obtain composite material (11).

Table 2 shows the results of evaluating powder properties and battery properties of the composite material (11).

TABLE 1

Physical properties of artificial graphite particles and silicon-containing particles

|  |  | Example 1 | Example 2 | Example 3 | Comparative Ex. 1 | Comparative Ex. 2 | Comparative Ex. 3 |
|---|---|---|---|---|---|---|---|
| Area (SOP) | μm$^2$ | 5.0 | 12.0 | 11.8 | 14.2 | 18.2 | 29.7 |
| Aspect ratio (AROP) | — | 2.19 | 2.05 | 2.05 | 2.26 | 2.16 | 2.11 |
| D50 | μm | 6.4 | 12.2 | 12.2 | 19.3 | 16.8 | 16.2 |
| (SOP × AROP)$^{1/2}$/D50 | — | 0.53 | 0.41 | 0.40 | 0.29 | 0.37 | 0.49 |
| d002 | nm | 0.3357 | 0.3357 | 0.3357 | 0.3357 | 0.3355 | 0.3365 |
| Lc | nm | 104 | 108 | 108 | 105 | 109 | 60 |
| BET specific surface area | m$^2$/g | 6.1 | 2.5 | 1.0 | 2.1 | 1.8 | 1.5 |
| Total pore volume | μl/g | 32.0 | 10.5 | 5.0 | 9.2 | 0.13 | 9.3 |
| Average circularity | — | 0.88 | 0.89 | 0.89 | 0.83 | 0.92 | 0.97 |
| I110/I004 | — | 0.28 | 0.11 | 0.11 | 0.04 | 0.29 | 0.65 |
| Raman R value | — | 0.15 | 0.13 | 0.04 | 0.12 | 0.30 | 0.30 |
| Shape of graphite | — | Not flaky | Not flaky | Not flaky | Flaky | Not flaky | Not flaky |
| Primary particle diameter of silicon-containing particles | nm | 50 | 50 | 50 | 50 | 50 | 50 |

|  |  | Comparative Ex. 4 | Comparative Ex. 5 | Comparative Ex. 6 | Comparative Ex. 7 | Comparative Ex. 8 |
|---|---|---|---|---|---|---|
| Area (SOP) | μm$^2$ | 3.0 | 6.2 | 12.0 | 12.0 | 12.0 |
| Aspect ratio (AROP) | — | 2.13 | 1.93 | 2.05 | 2.05 | 2.05 |
| D50 | μm | 18.5 | 5.1 | 12.2 | 12.2 | 12.2 |
| (SOP × AROP)$^{1/2}$/D50 | — | 0.14 | 0.68 | 0.41 | 0.41 | 0.41 |
| d002 | nm | 0.3365 | 0.3363 | 0.3357 | 0.3357 | 0.3357 |
| Lc | nm | 65 | 65 | 108 | 108 | 108 |
| BET specific surface area | m$^2$/g | 1.4 | 3.2 | 2.5 | 2.5 | 2.5 |
| Total pore volume | μl/g | 11.8 | 25.0 | 10.5 | 10.5 | 10.5 |
| Average circularity | — | 0.90 | 0.90 | 0.89 | 0.89 | 0.89 |
| I110/I004 | — | 0.38 | 0.70 | 0.11 | 0.11 | 0.11 |
| Raman R value | — | 0.12 | 0.06 | 0.13 | 0.13 | 0.13 |
| Shape of graphite | — | Not flaky | Not flaky | Not flaky | Not flaky | Not flaky |
| Primary particle diameter of silicon-containing particles | nm | 50 | 50 | 500 | 50 | 50 |

TABLE 2

Physical properties of the negative electrode material and battery characteristics

|  |  | Example 1 | Example 2 | Example 3 | Comparative Ex. 1 | Comparative Ex. 2 | Comparative Ex. 3 |
|---|---|---|---|---|---|---|---|
| D50 | μm | 9.3 | 14.4 | 14.7 | 20.9 | 18.6 | 20.3 |
| Primary particle diameter of silicon-containing particles | nm | 50 | 50 | 50 | 50 | 50 | 50 |
| BET specific surface area | m$^2$/g | 5.7 | 6.1 | 6.0 | 6.9 | 6.7 | 5.1 |
| d002 | — | 0.3358 | 0.3358 | 0.3358 | 0.3358 | 0.3355 | 0.3365 |
| Raman R value | — | 0.47 | 0.59 | 0.59 | 0.59 | 0.77 | 0.66 |
| Initial discharge capacity | mAH/g | 657 | 633 | 640 | 642 | 669 | 612 |
| Initial coulomb efficiency | % | 88.0 | 89.4 | 89.0 | 90.4 | 89.5 | 90.5 |
| Capacity retention rate after 100 cycles | % | 80 | 77 | 73 | 70 | 55 | 23 |

TABLE 2-continued

Physical properties of the negative electrode material and battery characteristics

|  |  | Comparative Ex. 4 | Comparative Ex. 5 | Comparative Ex. 6 | Comparative Ex. 7 | Comparative Ex. 8 |
|---|---|---|---|---|---|---|
| D50 | μm | 20.0 | 8.9 | 14.7 | 12.0 | 14.7 |
| Primary particle diameter of silicon-containing particles | nm | 50 | 50 | 500 | 50 | 50 |
| BET specific surface area | m$^2$/g | 6.0 | 6.7 | 5.9 | 7.5 | 10.1 |
| d002 | — | — | 0.3365 | 0.3364 | 0.3358 | 0.3358 | 0.3358 |
| Raman R value | — | — | 0.59 | 0.50 | 0.59 | 0.13 | 0.90 |
| Initial discharge capacity | mAH/g | 611 | 615 | 631 | 630 | 686 |
| Initial coulomb efficiency | % | 90.0 | 90.0 | 90.4 | 86.0 | 86.6 |
| Capacity retention rate after 100 cycles | % | 63 | 67 | 59 | 35 | 48 |

According to the present invention, a negative electrode material having a large discharge amount per mass can be obtained. In addition, through use of the negative electrode material, the lithium ion battery having a high capacity and being excellent in the initial efficiency and the charge-discharge cycle characteristics can be produced.

The invention claimed is:

1. A negative electrode material for a lithium ion battery, comprising silicon-containing particles, artificial graphite particles and a carbonaceous material, the negative electrode material having an average interplanar spacing d002 of plane (002) by X-ray diffraction method of 0.3358 nm or less and a BET specific surface area of 5.7 m$^2$/g or more and 6.1 m$^2$/g or less, wherein at least part of the silicon-containing particles, the artificial graphite particles and the carbonaceous material form composite particles;

wherein the silicon-containing particles are silicon particles having a SiOx (0<x≤2) layer on the particle surface, having an oxygen content of 1.0 mass % or more and 18.0 mass % or less, and a 90% particle diameter of primary particles in a number-based cumulative particle size distribution of 200 nm or less;

wherein the artificial graphite particles have a 50% particle diameter in a volume-based cumulative particle size distribution, D50, of 6.4 μm or more and 12.2 μm or less; a ratio between a peak intensity I$_{110}$ of (110) plane and a peak intensity I$_{004}$ of (004) plane of a graphite crystal determined by a powder XRD measurement, I$_{110}$/I$_{004}$, of or 0.11 or more and or 0.28 or less; and an average circularity of 0.88 or more and 0.89 or less.

2. The negative electrode material for a lithium ion battery according to claim 1, wherein the artificial graphite particles have an average interplanar spacing d002 of (002) plane by an X-ray diffraction method of 0.3357 nm or less and a total pore volume of pores having a diameter of 0.4 μm or less measured by a nitrogen gas adsorption method is 5.0 μl/g or more and 32.0 μl/g or less;

and by observing optical structures in a cross-section of the artificial graphite particle, when areas of the optical structures are accumulated from a smallest structure in an ascending order, SOP represents an area of an optical structure whose accumulated area corresponds to 60% of a total area of all the optical structures; when the structures are counted from a structure of a smallest aspect ratio in an ascending order, AROP represents an aspect ratio of a structure which ranks at a position of 60% in a total number of all the structures; and when D50 represents a median diameter in a volume-based cumulative particle size distribution by laser diffraction method, SOP, AROP and D50 satisfy the following relationships:

2.05≤AROP≤2.19 and 0.40×D50≤(SOP×AROP)$^{1/2}$<0.53×D50.

3. The negative electrode material for a lithium ion battery according to claim 1, wherein the artificial graphite particles have a 50% diameter in a volume-based cumulative particle size distribution by laser diffraction method, D50, of 10.0 μm or less.

4. The negative electrode material for a lithium ion battery according to claim 1, wherein the content of the silicon-containing particles is 5.0 parts by mass or more and 30.0 parts by mass or less with respect to 100 parts by mass of the artificial graphite particles.

5. The negative electrode material for a lithium ion battery according to claim 1, wherein the carbonaceous material is obtained by subjecting petroleum pitch or coal pitch to heat treatment.

6. The negative electrode material for a lithium ion battery according to claim 1, wherein the amount of the carbonaceous material is 2.0 mass % or more and 40.0 mass % or less to the total of the silicon-containing particles, the artificial graphite particles and the carbonaceous material.

7. The negative electrode material for a lithium ion battery according to claim 1, wherein the composite particles have a 50% diameter in a volume-based cumulative particle size distribution by laser diffraction method, D50, is 9.3 μm or more and 14.7 μm or less.

8. The negative electrode material for a lithium ion battery according to claim 1, wherein the ratio I$_D$/I$_G$ (R value) between the peak intensity (I$_D$) of a peak in a range of 1300 to 1400 cm$^{-1}$ and the peak intensity (I$_G$) of a peak in a range of 1580 to 1620 cm$^{-1}$ measured by Raman spectroscopy spectra when the composite particle is measured with Raman microspectrometer is 0.15 or 0.47 or more and 1.00 or 0.59 or less.

9. A paste comprising the negative electrode material for a lithium ion battery according to claim 1 and a binder.

10. An electrode for a lithium ion battery comprising a formed body of the paste for an electrode according to claim 9.

11. A lithium ion battery comprising the electrode according to claim 10 as a constituting element.

\* \* \* \* \*